Dec. 26, 1944.  B. LONG  2,365,967
METHOD OF TEMPERING GLASS
Filed May 28, 1940
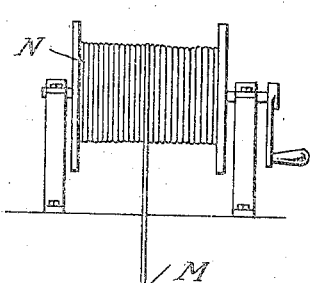
Fig.1.
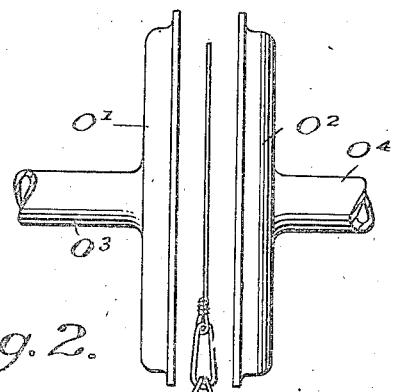
Fig.2.
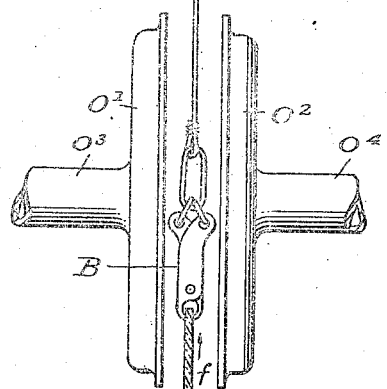
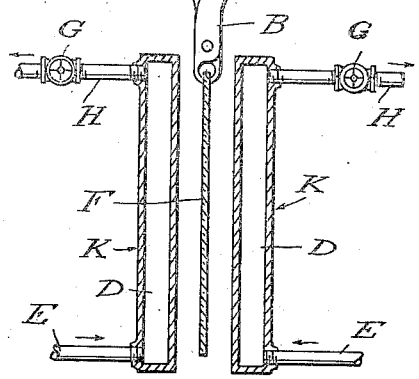
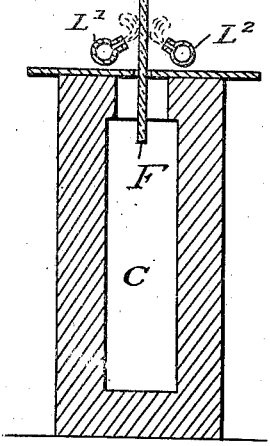
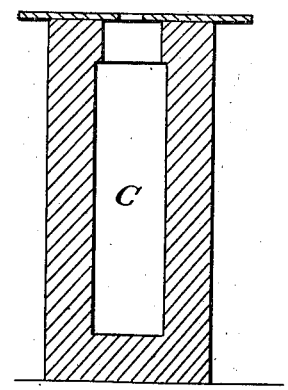
Inventor
BERNARD LONG
By Ducey Cole & Garner
Attorneys Patented Dec. 26, 1944

2,365,967

UNITED STATES PATENT OFFICE 2,365,967

METHOD OF TEMPERING GLASS

Bernard Long, Paris, France, assignor to The American Securit Company, a corporation of Delaware Application May 28, 1940, Serial No. 337,723
In France June 22, 1939

3 Claims. (Cl. 49—89)

It is well known that rapid cooling applied to a glass object preliminarily carried to a temperature near the softening point produced permanent tensions or strains in the glass which provide the finished object with advantageous properties, such as great mechanical strength, resistance to temperature variations and, particularly, in case of fracture, the property of breaking into small harmless fragments.

For certain uses it has been found desirable to provide the glass with tensions of different values in various zones thereof. This state of differentiated tensions may be produced by varying the cooling action in the different zones of the object. Applicant has now discovered that by the use of this method local deformations are very often produced in the finished object the distribution of which tallies approximately with the drawing according to which the zones of different tensions are distributed. These deformations may be attributed partly to the fact that in this method, when the object is still plastic in its mass—and thus particularly receptive to all causes of deformation—its surface is subject to tensions which are different according to the zones of the object. Another important cause of local deformation on the objects, and the effect of which is specially perceptible, consists in the mechanical pressure exerted on the glass by the cooling fluid, when the cooling is produced by jets of fluid projected on the parts at which it is desired to create tensions, as this projection should be the more energetic the greater the desired degree of tension to be obtained.

The present invention is applied particularly to advantage in cases in which it is desired to create relatively narrow zones of particularly high temper in a glass object adjacent to zones of much less temper, as in the case for example of the glass sheet or plate manufacture described in my United States application for Letters Patent filed December 17, 1935, Serial No. 54,918, now Patent No. 2,244,715, issued June 10, 1941.

The present invention relates to a method of differentiated temper through differentiated cooling under conditions which prevent the before mentioned deformations.

The invention consists in preceding the differentiated cooling above described by a uniform cooling, the intensity and duration of which are such that this cooling is exerted practically only on the superficial stratum of the object, tending to congeal this stratum so as to form a kind of "skin" on the surface of the object.

This uniform cooling is followed, in principle, directly by the differentiated cooling tending to create different tensions from one zone to the other.

By reason of the preliminary formation of a practically rigid glass film covering the entire surface of the glass object, these local cooling actions may be exerted unaccompanied by surface deformations; but at the same time, due to the uniformity and thinness of this superficial layer which covers the body of the plastic object, the cooling differences from one zone to the other of the object are transmitted to the body of the object at their complete value and thus create the tension differences with which the object is to be provided.

In other words, the presence of the uniform and uniformly thin surface film over the entire surface of a glass article, for example a glass sheet, preserves this surface from deformations which may result from cooling jets of localised action without opposing the desired thermal action of these jets at the interior of the glass mass forming the object or sheet.

The preliminary uniform cooling of the surface of the object may be obtained by different methods, and the values of the intensity and duration of this preliminary cooling are determined according to the selected cooling method.

Referring now to the drawing:

Figure 1 is an end view illustrating the preliminary cooling or chilling by means of air or gas jets.

Figure 2 is a similar view indicating the preliminary cooling or chilling by means adapted to absorb heat from the object to be tempered.

The glass sheet or plate F is heated approximately to its softening point in the furnace C.

The object may be preliminarily cooled by blowing on air, according to Fig. 1 of the accompanying drawing, on the plate F directly on its exit from the heating furnace C, by means of two continuous or practically continuous jets or sheets of air $L^1$—$L^2$, so as to involve the entire width of the plate F and between which the complete plate is passed while being transported, in the direction of the arrow $f$, from the furnace C to its location between the members $O^1$—$O^2$, which perform the differentiated cooling operation. Obviously the elements may be of any approved known construction to direct fluid locally on the sheet such instance as shown in the Long Patent No. 2,244,715, before referred to. Ducts $O^3$ and $O^4$ in communication with the chilling members $O^1$ and $O^2$ are connected with a source of air or gas under pressure.

The sheet or plate of glass is supported by tongs B connected to a cable M leading to a winding N. By these means, the sheet of glass is introduced into the furnace and withdrawn therefrom and transported for the preliminary chilling and the subsequent differential chilling.

A preliminary uniform cooling capable of forming a rigid, thin superficial film on the surface of the object, which is close to the softening point, and leaving the interior strata in plastic state, may consist also in allowing the object, directly after its exit from the furnace, simply to be exposed to the air, so as to permit it to radiate heat freely into the atmosphere. It has been found by applicant that the surface of a glass object, thus carried to a temperature near the softening point, is rapidly cooled by radiation, and in very short time acquires a sufficient state of rigidity, while the strata underneath, which radiate heat but very little, do not cool down sufficiently in this short time to lose their plasticity. Such natural cooling thus tends to provide the object with a rigid film covering a mass which remains sufficiently plastic, this film itself not being subject to surface deformation which the final differentiated cooling tends to produce but, nevertheless, it does not by its presence oppose the differentiated thermal actions of this cooling on the object.

In order to apply the present invention in the differentiated tempering of glass plates, according to my prior mentioned United States application, it has been found that where the thickness of these plates is about 6 mm. simple exposure of about 10 to 12 seconds in the air is sufficient for the formation of this film.

The preliminary cooling in open air just described does not imply positively that the glass object be placed in a zone of great dimensions, but it is intended also that radiation may be effected in a chamber of dimensions which may be reduced but the walls of which, with regard to their capacity for absorbing heat, are the equivalents, practically, of a zone of unlimited dimensions. For example, as shown in Figure 2, the preliminary cooling or chilling may be accomplished by the use of oppositely disposed heat-absorbing members K fashioned to provide a chamber D into which a cooling medium may be introduced through the pipe E and withdrawn through the pipe H. A valve G may be interposed in the pipe line H to regulate the extent of withdrawal of the cooling fluid, thereby providing for a regulation of the heat-absorbing capacity of the cooling members. The glass sheet or plate may be moved continuously between the members K or maintained stationary for a brief period between them.

It is to be understood that the two methods of preliminary uniform cooling described may be combined; but one is guided in the selection of the cooling method by the thickness of the glass. The thinner the glass plate the thinner the preliminary film must be, and in such case an artificial cooling method like that illustrated in Fig. 1, may be preferable to radiation in the open air.

It is to be understood that the means precedingly described for producing the intermediate uniform cooling, where the object is moved between the heating chamber and the differential cooling members, are applicable, by analogy, in the case in which the plate remains fixed, said chamber and said members being constructed so as to act successively on the plate and themselves be capable of being moved therefor.

Having thus described my invention what I claim as new, and desire to secure by U. S. Letters Patent is:

1. The method of tempering glass sheets or plates which consists in heating the sheet or plate approximately to its softening point, chilling the sheet uniformly throughout its area to an extent sufficient only to impart to the sheet a superficial skin and thereafter further chilling the sheet differentially whereby predetermined zones of different temper are established in the sheet.

2. The method of tempering glass sheets or plates which consists in heating the sheet or plate approximately to its softening point, presenting the sheet to a zone of heat absorption to chill the same uniformly throughout its area to an extent sufficient only to impart to the sheet a superficial skin and thereafter further chilling the sheet differentially whereby predetermined zones of different temper are established in the sheet.

3. The method of tempering glass sheets or plates which comprises: heating the sheet to a softening point, superficially and uniformly chilling the surface of the sheet without substantial chilling of the interior thereof, and rapidly differentially chilling the interior of the sheet, the superficial film formed by the superficial cooling being only sufficient to resist deformation of the sheet under the force of the last-named means.

BERNARD LONG.